(12) United States Patent
Kwon et al.

(10) Patent No.: US 6,983,779 B2
(45) Date of Patent: Jan. 10, 2006

(54) CELLULOSE DIP CORD PRODUCED FROM HIGHLY HOMOGENEOUS CELLULOSE SOLUTION AND TIRE USING THE SAME

(75) Inventors: Ik-Hyun Kwon, Seoul (KR); Soo-Myung Choi, Kyonggi-do (KR); Young-Soo Wang, Busan (KR); Sung-Ryong Kim, Daejun (KR); Jae-Shik Choi, Seoul (KR); Tae-Jung Lee, Kyonggi-do (KR); Seok-Jong Han, Kyonggi-do (KR)

(73) Assignee: Hyosung Corporation, Kyonggi-do (KR)

( * ) Notice: Subject to any disclaimer, the term of this patent is extended or adjusted under 35 U.S.C. 154(b) by 33 days.

(21) Appl. No.: 10/874,308

(22) Filed: Jun. 24, 2004

(65) Prior Publication Data

US 2005/0066646 A1 Mar. 31, 2005

(30) Foreign Application Priority Data

Jun. 30, 2003 (KR) ...................... 10-2003-0043254
Aug. 22, 2003 (KR) ...................... 10-2003-0058354

(51) Int. Cl.
*B60C 9/00* (2006.01)
*D02G 3/48* (2006.01)

(52) U.S. Cl. ...................... 152/451; 152/527; 152/556; 428/393

(58) Field of Classification Search ................ 152/451, 152/527, 556; 428/393
See application file for complete search history.

(56) References Cited

U.S. PATENT DOCUMENTS 3,447,939 A 6/1969 Johnson et al.
4,142,913 A 3/1979 McCorsley, III et al.
4,144,080 A 3/1979 McCorsley, III
4,196,282 A 4/1980 Franks et al.
4,211,574 A 7/1980 McCorsley, III et al.
4,246,221 A 1/1981 McCorsley, III
4,261,943 A 4/1981 McCorsley, III
4,416,698 A 11/1983 McCorsley, III
4,501,886 A 2/1985 O'Brien (Continued)

FOREIGN PATENT DOCUMENTS

GB 2 374 326 A 10/2002
JP SHO 53-81723 7/1978

(Continued)

OTHER PUBLICATIONS

Chanzy et al., Polymer, 1990 vol. 31, pp 400-405.

*Primary Examiner*—Adrienne C. Johnstone
(74) *Attorney, Agent, or Firm*—Nixon & Vanderhye P.C.

(57) ABSTRACT

The present invention relates to, and more particularily, to a lyocell dip cord and tire produced by a method comprising the steps of: (A) dissolving 0.01 to 3 wt % of cellulose powder in portions in concentrated liquid N-methylmorpholine N-oxide (NMMO) to prepare cellulose-containing NMMO solution; (B) feeding the NMMO solution and cellulose powder into an extruder having a screw to be subjected to dispersing, mixing, shearing, kneading, melting and measuring ability in the extruder to prepare a swollen and homogenized cellulose solution; (C) spinning the cellulose solution through a spinning nozzle, passing the spinning solution through an air gap to a coagulation bath and coagulating the spinning solution to obtain a multifilament; (D) subject the multifilament to water-wash, drying and oil-treatment, followed by winding; and (E) twisting the wound yarn with a twisting machine to prepare a greige cord, weaving the greige cord and dipping the woven cord in a dipping solution.

9 Claims, 2 Drawing Sheets

U.S. PATENT DOCUMENTS

| | | |
|---|---|---|
| 5,252,284 A | 10/1993 | Jurkovic et al. |
| 5,942,327 A | 8/1999 | Budgell et al. |
| 6,701,989 B2 * | 3/2004 | Choi et al. ................... 152/556 |
| 6,852,413 B2 * | 2/2005 | Lee et al. ................ 152/451 X |

FOREIGN PATENT DOCUMENTS

| | | |
|---|---|---|
| WO | 94/06530 | 3/1994 |
| WO | WO 96/30222 A | 10/1996 |
| WO | 97/47790 | 12/1997 |

* cited by examiner

CELLULOSE DIP CORD PRODUCED FROM HIGHLY HOMOGENEOUS CELLULOSE SOLUTION AND TIRE USING THE SAME

BACKGROUND OF THE INVENTION

1. Field of the Invention

The present invention relates to a method for producing tire using high strength lyocell dip cord, and more particularly, to a lyocell dip cord and tire produced by a method comprising the steps of: (A) dissolving 0.01 to 3 wt % of cellulose powder in portions in concentrated liquid N-methylmorpholine N-oxide (NMMO) to prepare cellulose-containing NMMO solution; (B) feeding the NMMO solution and cellulose powder into an extruder having a screw to be subjected to dispersing, mixing, shearing, kneading, melting and measuring ability in the extruder to prepare a swollen and homogenized cellulose solution; (C) spinning the cellulose solution through a spinning nozzle, passing the spinning solution through an air gap to a coagulation bath and coagulating the spinning solution to obtain a multifilament; (D) subject the multifilament to water-wash, drying and oil-treatment, followed by winding; and (E) twisting the wound yarn with a twisting machine to prepare a greige cord, weaving the greige cord and dipping the woven cord in a dipping solution.

2. Background of the Related Art

Various tire cord materials, such as polyester, nylon, aramid, rayon and steel, are currently used as a frame forming the inner part of a tire, but they do not satisfy perfectly various functions required in the tire cord. Basic performances required in such tire cord materials are as follows: (1) high tenacity and high initial modulus; (2) thermal resistance, and non-deterioration in dry and wet heat; (3) fatigue resistance; (4) dimensional stability; (5) excellent adhesion to rubber, and the like. Thus, the tire cord materials are used in applications according to their intrinsic physical properties.

For example, owing to low shrinkage and excellent dimensional stability in terms of intrinsic properties of fiber itself, as compared to polyester, a tire cord comprising rayon fiber has been mainly used in high-speed radial tires for automobiles which require good initial modulus (elasticity), thermal resistance, and dimensional stability among the above properties. The initial modulus is expressed by the slope of a load for bringing about extension to a given level and determined as the slope of an stress-strain curve obtained in a tensile test. A tire using a tire cord having a high modulus has effects to improve fatigue performance, heat generation, durability and the like, particularly handling stability of a radial tire, since it does not generate a little deformation under a load at a certain level. Particularly, a rayon cord does not show deterioration of physical properties in the temperature range (80~120° C.) upon tire running in practice and thus shows good handling stability, as compared to other cord materials for automobile tire.

However, since conventional rayon tire cords have a little low tenacity and their modulus is extremely reduced by moisture absorption, it is difficult to control moisture and progress upon production of tires. Also, when they are formed into tires, if moisture permeates due to damage of the tire surface, the strength and modulus decrease and hence, tire performance is deteriorated. Accordingly, there is a demand for a tire cord having excellent tenacity and properties capable of maintaining strength and modulus upon moisture absorption which may occur during the production process.

Meanwhile, lyocell fiber, an artificial fiber composed of cellulose has low elongation and heat shrinkage, high tenacity and modulus, and thereby, excellent dimensional stability, as compared to rayon fiber. Also, it has low moisture content and thus, shows strength maintenance and a modulus maintenance of 80% or more in time of moisture absorption. Therefore, since it has an advantage of relatively small dimension change as compared to rayon (60%), it can be considered as an alternative for the above demand. However, there are some problems in spinning into a tire cord, as described below and thus, a tire cord using the lyocell fiber is not yet realized.

A process of preparing lyocell fiber using cellulose and NMMO as a solvent is widely used to produce articles made of cellulose such as film or fiber because the process is pollution-free process by recycling all the used solvent and the article such as film or fiber manufactured by the process has high mechanical strength. The process is disclosed in the U.S. Pat. No. 3,447,939 and so on.

U.S. Pat. Nos. 4,142,913, 4,144,080, 4,196,282 and 4,246,221 disclose a process for making a fiber in which cellulose is swollen in NMMO aqueous solution which contains less than 50% water, and then, the water in the resultant NMMO aqueous solution is distilled under reduced pressure so as to make the dope, followed by extruding into the fiber.

These processes, however, requires relatively long time so that the physical, chemical properties of the fiber made by the processes are deteriorated due to thermal-decomposition. Also, it consumes a lot of energy, thereby increasing production cost.

PCT WO 1994/06530 discloses a process for making cellulose solution by removing water using a thin-film evaporator. This process, however, has some disadvantages, in that an apparatus for implementing the process is too complicated and the production efficient is too low to make highly viscose cellulose solution.

U.S. Pat. No. 4,211,574 discloses a process for making fiber by swelling a cellulose sheet using liquid-state tertiary amine oxide containing 5 to 15 wt % water as solvent at 65 to 95° C., followed by agitating and heating, and then, spinning.

This process, however, couldn't obtain homogeneous cellulose solution due to a film formed on the surface of pulp sheet.

U.S. Pat. No. 4,416,698 discloses a process for making fiber by feeding solid-state NMMO (not liquid-state) and cellulose pulp into an extruder, followed by agitating them, and then, spinning. This process, however, is not suitable for a mass production because there remain a great amount of powder particles which are not dissolved in a solution by using two kinds of powder.

PCT WO 1997/47790 discloses a process for making fiber in which fibril type cellulose powder and high concentration NMMO aqueous solution containing 5 to 20 wt % water at 50 to 130° C. instead of a cellulose pulp sheet are fed into a twin-screw type extruder, followed by mixing and dissolving them, and then, spinning.

This process, however, has some disadvantages in that since during the spinning, there remains a great amount of power particles which are not dissolved and impurities in the resultant solution, and hence a filter for removing them must be very frequently replaced. It makes the cost of production too high because of changing filters too often. And a great amount of powder particles which are not dissolved in the solution couldn't obtain homogeneous cellulose solution, which makes physical and chemical properties of the obtained fiber deteriorated.

U.S. Pat. No. 4,416,698 and PCT WO 1997/47790 disclose a process for making cellulose solution through mixing, swelling (paste) and dissolving processes in an extruder. These processes, however, has a disadvantage in that they don't fully dissolve the cellulose.

The foregoing technologies have a lot of problems in reduction of energy and production of a highly homogeneous and highly viscose cellulose solution without unsolved particles.

Meanwhile fibers used in the tire cords or the industrial fields have their product quality determined by fiber properties such as tenacity and modulus, unlike the clothing fields, in which color development and handling properties are important.

For this tendency, fiber makers use various fiber production technologies to maximize properties of fiber and continuously improve fiber quality. Among various methods to improve fiber properties, by a structure having a polymer oriented along a fiber axis, it is possible to provide a fiber with excellent properties for clothing and industrial applications. Mostly, the orientation is achieved by drawing and the drawing step of various processing steps largely affects mechanical properties of a fiber.

In case of melt spinning, the drawing is carried out in a thermoplastic state in which a molecule shows good fluidity, while in case of solution spinning, the drawing is carried out by a wet or dry spinning method, after preparing a solution comprising a solvent and a polymer. For the dry spinning, the drawing is carried out while the solvent is being evaporated and for the wet spinning, the drawing is carried out mostly during coagulation according to the concentration of a coagulation liquid and temperature.

On the other hand, a spinning solution comprising three components of NMMO/water/cellulose which are commonly used for production of lyocell fiber is in a high temperature state of 80 to 130° C. Therefore, if the spinning is carried out by directly dipping a spinning nozzle in a coagulation bath like general wet spinning, it is difficult to attain sufficient drawing performance and properties due to rapid coagulation by solvent removal. Also, only dry spinning of a highly viscose cellulose solution of about 10,000 poise, the evaporation of the solvent cannot be achieved because NMMO is non-volatile.

There is proposed a dry-wet spinning method as a technology to improve physical properties and spinnability by maximally utilize an air gap between the spinning nozzle and the interface of the coagulation bath.

For example, U.S. Pat. No. 4,501,886 discloses a method for spinning cellulose triacetate using an air gap. Also, Japanese Patent Laid-Open No. Sho 53-81723 discloses a high speed spinning method of PAN fiber using an air gap, and U.S. Pat. No. 4,261,943 discloses to spray water as a non-solvent to an air gap in the range of 50 to 300 mm to prevent adhesion between filaments.

The foregoing technologies may increase degree of orientation of a fiber which is spun using an air gap. However, when they are directly applied to the production of lyocell multifilament for tire cords, there are factors making the process unstable such as adhesion between filaments due to increase of the number of filaments and it is thus difficult to realize a satisfactory spinning workability. Particularly, lyocell fibers obtained by the above methods show properties of tenacity and elongation which are not suitable for use as a tire cord.

Also, H. Chanzy et al. (Polymer, 1990 Vol. 31, pp 400~405) have prepared a fiber having a tenacity of 56.7cN/tex and an elongation at break of 4% by adding a salt such as ammonium chloride or calcium chloride to a solution of cellulose of DP 5,000 dissolved in NMMO, followed by air gap spinning. It cannot be commercially used because of problems of collecting the coagulation liquid with the salt added.

According to U.S. Pat. No. 5,942,327, a fiber is prepared to have a tenacity of 50~80cN/tex, elongation of 6~25% and monofilament fineness of 1.5dtex by air gap spinning of a solution of cellulose of DP 1,360 dissolved in a NMMO hydrate. However, the number of filaments is only 50.

Considering that a filament for tire cords commonly comprises several hundreds of filaments to be more or less of 1,500 denier, it is judged difficult to attain properties required for a tire cord after twisting and dipping. In practice, for spinning of fiber, it is harder to control the condition of cooling, drying and washing in time of spinning of a thick denier fiber than a thin denier fiber. Thus, it is difficult simultaneously to realize properties of over a certain level and to maintain uniformity of individual filaments as a whole and consequently, only by examining properties of a fiber composed of 50 strands, it cannot be applied to a yarn for industrial application.

Also, the air gap spinning shows change in process stability and cooling efficiency for adhesion of filaments spun from a spinning nozzle in accordance with increase of the number of filaments. Therefore, there is a need for a new design considering the outer diameter of a spinning nozzle, orifice diameter, orifice gap, air gap length, conditions for supplying quenching air, running direction of coagulated liquid and drying conditions according to a spinning rate and the new design may cause change of physical properties.

In U.S. Pat. No. 5,252,284, 800 to 1,900 filaments were used and the spinning was carried out under conditions including a short air gap of 10 mm or less and a winding speed of 45 m/min. As a result, due to low draw ratio, it was found that elongation was as high as 15.4% and tenacity was at maximum 47.8cN/tex, which indicated that it is difficult to be used as yarn for tire cord in terms of tenacity and productivity.

Therefore, to solve the problems involved in the prior art, the present inventors has discovered that by dissolving a small amount of pulp to concentrated liquid NMMO, the solidification temperature of NMMO can be lowered, and consequently, the NMMO solution can be fed to an extruder at a relatively low temperature and the process temperature range can be expanded. Also, by the above effect, cellulose powder can be smoothly swollen with the NMMO solution at a low temperature and film formation on the surface of the cellulose powder can be prevented, whereby it is possible to prepare a homogeneous cellulose solution at a low temperature. Further, based on the above discovery, it is possible to prepare cellulose fiber with excellent tenacity by a dry-wet spinning method, which is suitable for a tire cord. Thus, the present invention has been completed.

SUMMARY OF THE INVENTION

Therefore, the present invention has been made to solve the above-described problems and according to the present invention, it is possible to feed a N-methylmorpholine N-oxide (NMMO) solution to an extruder at a relatively low temperature by previously dissolving a small amount of 0.01 to 3 wt % of cellulose powder in a concentrated liquid NMMO to prepare a NMMO solution with solidification temperature lowered. Consequently, the process temperature range can be expanded and cellulose powder can be smoothly swollen with a NMMO solution at a low temperature, whereby it is possible to prevent a film from being formed on the surface of cellulose powder and to prepare a homogeneous cellulose solution at a low temperature. Accordingly, since degradation of cellulose occurring at high temperature during production of the solution can be prevented, physical properties of final yarn are improved and a process can be carried out at a low temperature, whereby energy expenses are reduced, giving economical advantages.

Also, according to the present invention, there can be provided cellulose fiber having excellent properties such as tenacity and modulus by using a homogeneous cellulose solution prepared at a low temperature to inhibit degradation of cellulose and NMMO during the swelling and dissolution process at a high temperature in the extruder.

Finally, the object of the present invention to provide a lyocell dip cord for a tire cord having excellent properties such as tenacity and modulus and good dimensional stability by preparing a homogeneous cellulose solution and a tire using the same.

To accomplish the above object, according to an aspect of the present invention, there is provided a lyocell dip cord for tire cord produced by a method comprising the steps of: (A) dissolving 0.01 to 3 wt % of cellulose powder in portions in concentrated liquid N-methylmorpholine N-oxide (NMMO) to prepare cellulose-containing NMMO solution; (B) feeding the NMMO solution and cellulose powder into an extruder having a screw to be subjected to dispersing, mixing, shearing, kneading, melting and measuring ability in the extruder to prepare a swollen and homogenized cellulose solution; (C) spinning the cellulose solution through a spinning nozzle, passing the spinning solution through an air gap to a coagulation bath and coagulating the spinning solution to obtain a multifilament; (D) subject the multifilament to water-wash, drying and oil-treatment, followed by winding; and (E) twisting the wound yarn with a twisting machine to prepare a greige cord, weaving the greige cord and dipping the woven cord in a dipping solution.

The lyocell dip cord for tire cord which is produced by the above method has the following properties;

(1) a tensile strength of 14.0 to 35.0 kgf, (2) a fineness of 2,000 to 7,000 denier, (3) a fatigue resistance of 80% or more, (4) an adhesion to rubber of 10.0 to 17.0 kgf, (5) a twist constant of 0.30 to 0.95, and (6) the sum of elongation at specific load (at a specific load of 4.5 kgf) and shrinkage (E-S) of 1.0 to 4.0.

Preferably, the said NMMO in the step (A) is provided at a temperature of 50 to 100° C.

Preferably, the said twisting in the step (E) is carried out at 300/300 TPM to 500/500 TPM for cable twist/ply twist.

Preferably, the said twisting in the step (E) is carried out at 350TPM to 550TPM for cable twist and at 300TPM to 550TPM for ply twist and said twisting for cable twist and ply twist are different from each other.

According to another aspect of the present invention, there is also provided a pneumatic radial tire having an aspect ratio of less than 0.65, which comprises a pair of parallel bead cord, at least one radial carcass ply wound around the bead cores, a belt layer formed on the outer circumferential side of the carcass ply, a circumferential belt-reinforcing layer formed on the outer circumferential side of the belt layer, in which the carcass ply or belt-reinforcing layer comprising the said lyocell dip cord.

Preferably, the said carcass ply is used in a single layer structure or a two-layered structure.

Preferably, the said belt-reinforcing layer is reinforced by a cap ply.

Preferably, the said carcass ply or belt-reinforcing layer has a dip cord reinforcement density of 15 to 35 EPI (ends per inch).

DETAILED DESCRIPTION OF THE PREFERRED EMBODIMENT

Hereafter, referring to figures, we explain this invention more specifically.

Figure 1:
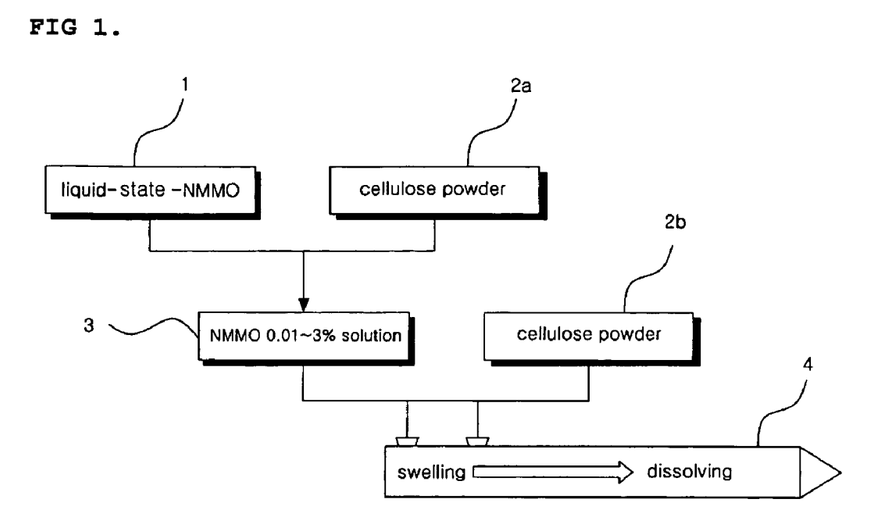
FIG. 1 is a block diagram illustrating an embodiment of the method of preparing homogeneous cellulose solution according to the present invention.

FIG. 1 is examples of this invention, and they are block diagrams illustrating an embodiment of the method of preparing cellulose solution that is homogeneous at low temperature.

In FIG. 1, the cellulose powder $2a$, $2b$ is well pulverized by using a pulverizer having a knife to have a particle size of less than 5,000 $\mu$m, and more specifically, less than 500 $\mu$m.

If the particle size over 5,000 $\mu$m, the powder will be not dispersed and swollen uniformly in the kneader or extruder 4.

Firstly, a small amount of cellulose powder $2a$ having a particle size of less than 5,000 $\mu$m is dissolved in the concentrated liquid NMMO solvent 1.

The content of the cellulose powder $2a$ in the concentrated liquid NMMO solvent 1 is in the range of 0.01 to 3 wt %, and more specifically, in the range of 0.05 to 2 wt %.

Also, the antioxidant is dissolved with the pulp at a concentration of 0.005 to 0.5 wt % relative to the final cellulose.

If the content of the cellulose powder $2a$ is less than 0.01 wt %, the cellulose powder will not affect the swellability, and if the content is more than 3 wt %, the viscosity of the NMMO solution 3 is too high to feed the NMMO solution into the extruder 4.

In accordance with this invention, the concentrated liquid NMMO 1 is prepared by concentrating the 50 wt % of NMMO solvent to have 10 to 15 wt % water contents. It is not preferable to concentrate the NMMO solvent to have water content less than 10 wt %, it is not proper economically, and if the water content is more than 15 wt %, the solubility of the NMMO solvent is too lower.

The cellulose powder $2b$ and the NMMO solution 3 containing a small amount of cellulose powder $2a$ are fed into the extruder 4 maintained at the temperature in the range of 65 to 110° C. continuously, and then, mixed, swollen and dissolved in the extruder 4 to produce homogeneous cellulose solution.

The NMMO solution 3 containing a small amount of the cellulose powder $2a$ can be fed into the extruder 4 by a gear pump or a screw-type feeder, and the cellulose powder 2b can be introduced preferably into the extruder 4 by a screw-type feeder.

The content of the cellulose powder 2a, 2b in the cellulose solution mixed, swollen and melted in the extruder 4 is in the range of 3 to 20 wt %, and more specifically, 9 to 14 wt % to the concentrated liquid NMMO 1 according to the degree of polymerization of the cellulose powder.

If the content of the cellulose powder 2a, 2b is less than 3 wt %, the physical and chemical properties of fiber cannot be obtained properly, and if the content of the cellulose powder is more than 20 wt %, the homogeneous solution cannot be obtained because the cellulose powder is not dissolved in the liquid-state NMMO solvent 1.

According to this invention, the extruder 4 used in the step (B) so as to produce a cellulose solution which is swollen and homogeneous is preferably twin-screw type extruder, and the twin-screw type extruder has 3 to 16 barrel or 12 to 64 L/D(length/diameter) of the screw. If the barrel is less than 3 or the L/D of the screw is less than 12, the time the cellulose solution pass through the barrel is too short so as to produce power particles which are not dissolved in the solution, and if the barrel is more than 16 or the L/D of the screw is more than 64, the screw of the extruder can be deformed because of excess stress acted to the screw.

According to this invention, the cellulose powder 2a, 2b in the step (A) or (B) can be mixed with other polymer or additives. Polyvinyl alcohol, Carboxylmethyl cellulose or polyethylene glycol can be used as the above polymer, and thickener, titanium dioxide, silicon dioxide, carbon or ammonium chloride can be used as the additives.

Figure 2:
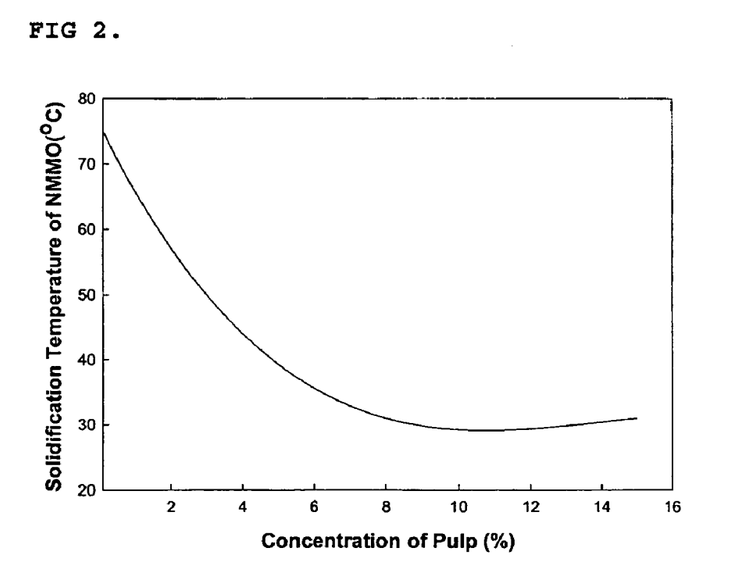
FIG. 2 a graph illustrating the history of shift of the solidification temperature of the NMMO solution versus the concentration of the cellulose pulp.

FIG. 2 is a graph illustrating the history of shift of the solidification temperature of the NMMO solution versus the concentration of the cellulose pulp. In this figure, the solidification temperature of the NMMO is greatly lowered from 75° C. to 40° C. by dissolving a small amount of cellulose (about 0.01 to 5 wt %).

According to this invention, as described above, by dissolving a small amount of cellulose pulp in the concentrated liquid NMMO 1 so as to lower the solidification temperature of the NMMO solution 1, it is possible to feed the NMMO solution 3 into the extruder 4 at relatively low temperature. Thereby, the process temperature range can be expanded. Also, by the above effect, cellulose powder 2b can be smoothly swollen with the NMMO solution 3 at a low temperature and film formation on the surface of the cellulose powder 2b can be prevented, whereby it is possible to prepare a homogeneous cellulose solution at a low temperature finally. Therefore, since the degradation of cellulose occurring at a high temperature during the production of the solution can be prevented, the properties of final yarn can be improved and moreover, the process can be carried out at a low temperature, whereby economical profits by reduction of energy can be expected.

Hereinafter, the manufacturing method for making cellulose fiber comprising the step of spinning the obtained, homogeneous cellulose solution, water-washing, drying and winding is described in detail as follows. The cellulose fiber according to the present invention, however, is not limited to the cellulose fibers obtained by the following processes.

In the manufacturing method according to the present invention, the (C) step of a spinning step, is carried out by discharging and spinning the obtained dope through a spinning nozzle comprising numbers of orifice, and the orifice has 100 to 300 μm of diameter, 200 to 2,400 μm of length, and L/D of 2 to 8 times, and the distance between the orifices is 1.0 to 5.0 mm, and solidifying the spinning solution through an air gap and coagulation bath so as to obtain multifilament.

The spinning nozzle used in the above has a round shape, and the diameter of the nozzle is in the range of 50 to 200 mm, and more specifically, in the range of 80 to 130 mm. If the diameter of the nozzle is 50 mm or less, it is too short the distance between the orifices so the efficiency of quenching is to be lowered and the discharged dope is tend to stick each other before they were solidified, and if the diameter of the orifice is 100 μm or less, or 300 μm or more, spinnability may be lowered, for example, occurrence of cutting of yarns. If the length of the orifice of the nozzle is 200 μm or less, the dope is not fully oriented so the obtained fiber has a bad property, and if the length of the orifice of the nozzle is 2,400 μm or more, too much cost and effort is necessary to produce the orifice.

It is more preferred to use the nozzle comprising 500 to 2,200, and more specifically, 700 to 1,400 of the orifice number for making industrial fiber, more specifically, for making tire cord, and for quenching the dope uniformly. There were some efforts for making lyocell fiber. However, there is no report that high strength filament for tire cord using lyocell fiber was manufactured successfully. As the number of filament is increased when spinning, there are many factors that affect to the spinnability and high degree spinning techniques are required.

According to the present invention, to solve the above problems, the spinning nozzle comprising the orifice number which satisfies the above-mentioned specific conditions is used. If the number of the orifice is 500 or less, the fineness of each filament is too thick to extract the NMMO from the filament in a short time so solidifying and water-washing the filament cannot be enough. And if the number of the orifice is 2,200 or more, it is easy to contact between the filaments in the area of air gap, and after spinning, the stability of each filament is too lowered so as to occur lowering of properties of the obtained fiber. Moreover, the obtained fiber may cause problems in the process of twisting and dipping for producing tire cord.

When spinning solution which passed the spinning nozzle is coagulated in the upper coagulation solution, the filament formed from the dope is too thick, the differences of the coagulation speed between the surface and inner part is occurred so that the fiber having fine and uniform structure hardly can obtained. Therefore, in case of the same amount of dope is spinning, the filament can be fed into the coagulation solution maintaining more thin diameter by controlling the air gap properly. If the air gap is too short, it is hard to increasing the draw ratio because of rapid surface-solidifying and increasing the ratio of micropores-forming during desolventation, and these makes hard to increase the draw ratio of the filament and also hard to increase the speed of the spinning for making filament. Contrary, if the air gap is too long, it is hard to maintain the stability of the processing because of adhering between filaments and influences of ambient temperature and humidity.

The air gap is 10 to 200 mm, and more specifically, 20 to 100 mm. When the filament is passing the air gap, quenching air can be fed in order to preventing adhering between filaments by cooling and solidifying the filament, and at the same time, increasing the penetration resistance to the coagulating solution. The quenching air can be controlled by monitoring the temperature and humidity of the air by a sensor located between the inlet of the quenching air supplying apparatus and filament. The temperature of the air can be controlled in the range of 5 to 30° C. If the temperature of the air is 5° C. or less, the solidification of the filament is too rapid so high-speed spinning is hard to proceed, and also it is not proper economically because it costs too much for cooling. Contrary, if the temperature of the air is 30° C. or more, the quenching effect of spun is too lowered so cutting of yarns can be occurred.

Also, the content of the water in the air is one of the most important factors and it can affect the solidifying of the filament. It is preferred to control the relative humidity in the range of 10 to 50% RH in the air gap. More specifically, it is preferred to provide dry air controlled the relative humidity in the range of 10 to 30% RH to the surroundings of the nozzle, and wet air controlled the relative humidity in the range of 30 to 50% RH to the surroundings on the coagulation solution in order to increase the stabilities of the speed of solidifying of the filament and sticking at the surface of the spinning nozzle. It is preferred to blow the quenching air horizontally to the side face of the filament that spun downwardly. It is preferred to control the speed of the quenching air in the range of 0.5 to 10 m/second, and more specifically, in the range of 1 to 7 m/sec. If the speed of the quenching air is too slow, the quenching air cannot prevent the other conditions of ambient atmosphere, and it is hard to obtain uniform filament because there are some differences of solidifying speed in the area contacting with the quenching air at the latest and cutting of yarns. Otherwise, if the speed of the quenching air is too fast, the spinning stability is too low, caused by swinging the course of the filament, adhering between filaments and preventing uniform flowing of the dope.

The composition of the coagulation bath used in the present invention is 5 to 40 wt % of aqueous NMMO solution. When the filament passing the coagulation bath, the speed of spinning is 50 m/minute or more, the shaking of the coagulation solution will be extreme by the friction between the filament and the coagulation solution. In order to increase the productivity by increasing the speed of spinning and to achieving excellent properties through orientation and drawing, it is required to minimize these phenomena by the design of coagulation bath considering size and morphology of coagulation bath, flow and quantity of coagulation solution, because these phenomena can affect to the stability of the processing.

In the step (D) according to the present invention, the obtained multifilaments are introduced into the water-washing bath, and water-washed them. As a desolventation and drawing that can affect the properties of the filament greatly were occurred simultaneously during the filament pass the coagulation bath, the temperature and concentration of the coagulation solution should be maintained constantly. The filament that passed out the coagulation bath is water-washed in the water-washing bath. The water-washing method is well known to the ordinary skilled technical expert in the art.

The water-washed multifilament, then, dried and oil-treated, followed by winded. Drying, oil-treating and winding processes are well known to the ordinary skilled technical expert in the art. Then, the obtained filament can be used for manufacturing of tire cord or yarn for industrial filament.

The obtained lyocell multifilaments according to the present invention have 1,000 to 3,000 of total deniers and 7.0 to 24.0 kgf of tensile strength. The multifilaments comprise 500 to 2,200 of filament, and each filament has a fineness of 0.5 to 4.0 deniers. The filament also has a tenacity of 5.0 to 10 g/d, an elongation of 4 to 10%, an elongation at 4.5 kg load of 0.5 to 4.0%, a modulus of 200 to 400 g/d, birefringency of 0.030 to 0.060, a shrinkage of −0.5 to 3%. So, the filament is useful to manufacture a tire cord of automobile.

Particularly, according to the present invention, the high strength cellulose fiber can be produced by producing a homogeneous cellulose solution by dissolving a small amount of pulp in the liquid NMMO 1 to lower the solidification temperature of a liquid NMMO 1 and facilitate swelling of cellulose powder 2b with a NMMO solution 3 at a low temperature and spinning, thereby preventing a thin film from being formed on the surface of cellulose powder 2b, and spinning the cellulose solution.

In the step (E) according to the present invention, the wound yarn is twisted to produce a greige cord using twisting machine. The cord is woven and dipped in the dipping solution to provide a tire cord and a tire.

In a more detailed description of the twisting process of the present invention, the 2 ply of wound yarn of lyocell multifilament produced by the method as described above is twisted with a direct twisting machine where cable and ply twist are conducted at the same time. This gives a greige cord for tire cords. This greige cord is produced by plying and cabling two strands of the lyocell yarn for tire cords, in which the plying and cabling generally have the same twist number, or if necessary, different twist numbers.

An important result in the present invention is that the tenacity and elongation, elongation at specific load and fatigue resistance, etc. of a cord depend on the twist number of the lyocell multifilament. Generally, as the number of twists is increased, the strength of the cord is decreased and the elongation at specific load and elongation at break of the cord are increased. The fatigue resistance of the cord shows a tendency to increase as the twist number is increased. In the present invention, the lyocell tire cord is produced to a twist number of 300 (cable twist)/300 (ply twist) TPM to 500 (cable twist)/500 (ply twist) TPM. The reason why the cabling and plying have the same twist number is because the resulting tire cord is easily maintained at a linear shape to exhibit its physical properties at the maximum, without showing revolutions or twists. If the twist number is smaller than 300/300 TPM, the elongation at break of the greige cord can be reduced, resulting in a decrease in its fatigue resistance, whereas if the twist number is higher than 500/500 TPM, a great reduction in strength of the greige cord will occur, making it unsuitable for tire cords.

In the present invention, the cabling and plying may also be performed to different twist numbers, if necessary. In this case, a greige cord is produced in such a manner that the cabling is performed to a twist number of 350–550 TPM, and the plying, at 300–550 TPM. The reason why the cabling and plying are performed to different twist numbers is because, within a range of physical properties, the lower the twist number, the lower the twisting costs, resulting in economic advantages. As a constant of evaluating such a twist, there is proposed a twist constant in the relevant field of the art.

The greige cord produced is woven with a weaving machine, and the resulting woven fabric is dipped in a dipping solution and cured. This gives a dip cord for tire cords having a resin layer attached to the surface of the greige cord.

In a more detailed description of the dipping process of the present invention, dipping is accomplished by dipping the surface of the fiber with a resin solution, called resorcinol-formalin-latex (RFL). This dipping is carried out in order to overcome the intrinsic shortcoming of the insufficient adhesion to rubber of a fiber for tire cords. A conventional rayon fiber or nylon fiber is subjected to a one-bath dipping, but in the case of a PET fiber, its surface is first activated and then treated with adhesives (two-bath dipping), since the reactive groups of the PET fiber are smaller than the rayon fiber or nylon fiber. The lyocell multifilament according to the present invention is subjected to the one-bath dipping using a dipping bath known for tire cords.

The dip cord prepared according to the above-described method has a total fineness of 2,000 to 7,000 denier, a twist constant of 0.30~0.95 and a tensile strength of 14.0 to 35.0 kgf and thus, can be advantageously used as a tire cord for passenger cars.

Also, the lyocell dip cord according to the present invention can be used as a material for a carcass ply or cap ply of a pneumatical radial tire.

Figure 3:
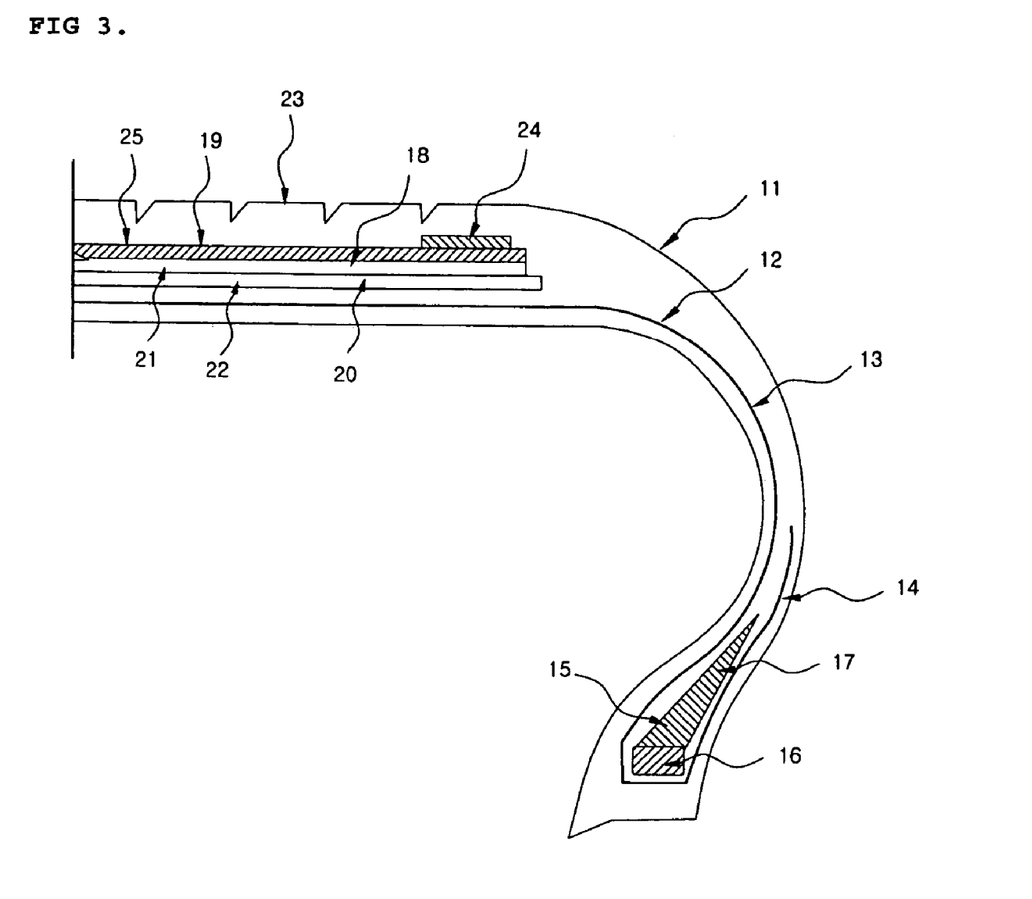
FIG. 3 schematically shows the structure of an automobile tire using lyocell multifilament according to the present invention.

Concretely, a tire cord as shown in FIG. 3 is produced. More concretely, a carcass cord 13 made of the lyocell dip cord produced by the present invention has a total denier of 2,000–7,000. A carcass ply 12 comprises at least one layer of the tire cord 13 for carcass ply reinforcement. The reinforcement density of the dip cord in the carcass ply is preferably 15–35 EPI. If the reinforcement density is lower than 15 EPI, the mechanical properties of the carcass ply will be lowered rapidly, whereas if it exceeds 35 EPI, disadvantages with respect to economic efficiency will be caused.

The carcass ply 12 with a ply turn-up 14 extending radially outward therefrom comprises carcass cords, preferably in one or two layers. The carcass cord 13 for reinforcement is arranged at an angle of 85–90° with respect to the central surface of circumferential direction of a tire 11. In the shown embodiment, the reinforcing carcass cord 13 is arranged at an angle of 90° with respect to the central surface of circumferential direction of the tire. The ply turn-up 14 preferably has a height of about 40–80% relative to the maximum section height of the tire. If the ply turn-up has a height of less than 40% relative to the maximum section height, its effect of reinforcing the rigidity of tire sidewalls will be excessively reduced, whereas if is higher than 80%, an excessive increase in rigidity of the tire sidewalls will be caused, resulting in an adverse effect on ride comfort.

A bead region 15 of the tire 11 has a non-elongated annular bead core 16. This bead core is preferably made of a continuously wound single-filament steel wire. In a preferred embodiment, a high tenacity steel wire with a diameter of 0.95–1.00 mm is formed into a 4×4 structure or a 4×5 structure.

In a preferred embodiment of the present invention, the bead region has a bead filler 17. The bead filler needs to have hardness higher than a certain level, and preferably a shore A hardness of 40. Hardness higher than shore A hardness 60 is more preferable.

In the present invention, the tire 11 is reinforced with a structure of a belt 18 and a cap ply 19 at its crown portion. The belt structure 18 comprises two cut belt plies 20. A cord 21 of the belt ply 20 is arranged at about 20° with respect to the central surface of circumferential direction of the tire. The cord 21 of the belt ply is disposed in the opposite direction to the central surface of circumferential direction, namely, opposite direction to a ply cord 22 of another belt. However, the belt 18 may comprise an optional number of plies, and preferably can be disposed at an angle range of 16–24°. The belt 18 acts to provide lateral directional rigidity so as to minimize the rising of a tread 23 from the road surface during the running of the tire 11. The cords 21, 22 of the belt 18 are made of steel cords in a 2+2 structure, but may also have other structures. The upper portion of the belt 18 is reinforced with a cap ply 21 and an edge ply 24. A cap ply cord 25 within the cap ply 19 is disposed in the parallel direction to the circumferential direction of the tire and serves to inhibit a change in size of circumferential direction by high-speed running of the tire. Although one layer of the cap ply 19 and one layer of the edge ply 21 may be used, one or two layer of the cap ply and one or two layers of the edge ply are preferably used. As the cap ply cord, the lyocell dip cord prepared according to the present invention can be used.

Hereinafter, this invention is described in detail with referenced to the following examples, but it is to be understood that the examples is solely for the purpose of illustration and do not limit the scope of this invention. In the following examples, the physical properties of cellulose solution and filament were measured using the following measuring method.

(a) Degree of Polymerization (DP)

The intrinsic viscosity [IV] of the dissolved cellulose is measured as follows. 0.5M cupraethylenediamine hydroxide solution in the range of 0.1 to 0.6 g/dl concentration obtained according to ASTM D539-51T is measured by using an Uberod viscometer at 25±0.01° C. The intrinsic viscosity is calculated from the specific viscosity by using the calculation method of extrapolation and then Mark-Hauwink's equation to obtain the degree of polymerization.

$[IV]=0.98\times10^{-2}DP^{0.9}$ (b) Strength (kgf) and Elongation at Specific Load (%)

The tenacity of the filament is measured using low speed elongation tester (Instron Co., Ltd, USA), and the filament is tested after being dried at 107° C. for 2 hours. The filament is twisted by 80TPM (80 turns/meter), and gauge length is 250 mm and the elongation speed is 300 m/min. The elongation at specific load is the degree of elongation at 4.5 kg load.

(c) Shrinkage %

The shrinkage is represented the ratio of the length ($L_0$) measured at 0.05 g/d static load after being treated at 25° C., 65% RH for 24 hours to the length ($L_1$) measured at 0.05 g/d static load after being treated at 150° C. for 30 minutes.

$S(\%)=(L_0-L_1)/L_0\times100$ (d) E-S

The elongation (E) means the elongation at specific load (EASL) in the present invention, and in this the specific load is 4.5 kg load. The specific load of 4.5 kg load means the maximum load acted to each tire cord. And 'S' means the shrinkage of the above item (c). The sum of the elongation (E) and shrinkage(s) and represents as 'E-S' in the present invention. Generally, the tire is vulcanized, the shrinkage and the elongation of the cord is changed. The sum of the elongation(E) and shrinkage(s), 'E-S' is similar to the modulus of the tire obtained. That is, if the value of 'E-S' is lowered, the modulus is raised. The modulus is raised, the drive-operation property of the vehicle can be increased because the amount of force forming according to the transformation of the tire is increased. Contrary, in case that the same extent of tension is required, it is possible to the small transformation of the tire. It means the operation property of the vehicle is good, and the dimensional stability of the tire is also good. So, the above value of 'E-S' is utilized to estimate the performance of cord when manufacturing a tire. And, when manufacturing a tire, the cord having the low 'E-S' value can be used effectively because the deformation of the tire by heat is low. So, it is possible to obtain good and morphologically uniform tire. And also, it is possible to obtain a tire having good performance because the uniformity of tire is increased in case of using the low 'E-S' value cord in comparison with the case of using the high 'E-S' value.

E-S=elongation (Elongation at 4.5 kg)+shrinkage (e) Twist Constant (R)

A twist constant (R) is calculated by the following equation. Cords having the same twist constant indicates that plied and cabled yarns are reinforced at the same angle with respect to the longitudinal direction of the cords:

$$R = N \times \sqrt{0.139 \times \frac{D}{\rho}} \times 0.001$$

Wherein R is a twist constant, N is a twist number per 10 cm, D is a total denier, and ρ is a specific gravity.

(f) Fatigue Resistance

Samples were subjected a fatigue test using a Goodrich disc fatigue tester which is conventionally used for the fatigue test of tire cords. Then, they were measured for residual strength, and fatigue resistances were compared. The fatigue test was conducted under the following conditions: 120° C., 250 rpm, and 18% compression. After the fatigue test, the samples were dipped in tetrachloroethylene solution for 24 hours to swell rubber, and then, a cord was separated from the rubber and measured for residual strength. This residual strength was measured using a conventional tensile strength tester by the above-described measurement method (b), after drying at 107° C. for 2 hours.

(h) Adhesion

Adhesion is measured by the H-test method according to ASTM D4776-98.

EXAMPLE 1

A cellulose sheet having a weight average degree of polymerization of 1200 was put in a pulverizer equipped with a 100 mesh size filter to prepare cellulose powder having a diameter of 5000 μm or less, which the cellulose contents in NMMO solution were 0.05 wt %, 0.5 wt %, 1.0 wt %, 1.5 wt %, 2.0 wt %, as shown in Table 1. An antioxidant was dissolved to 0.070 wt % relative to final cellulose.

Each of the NMMO solutions having cellulose dissolved at 0.05 wt %, 0.5 wt %, 1.0 wt %, 1.5 wt %, 2.0 wt % was injected at an injection temperature of 45 to 55° C. to an extruder 4 maintained at an inside temperature of 70 to 80° C. using a gear pump. The cellulose powder was injected to the extruder using a screw type feeder and heated to a temperature of 60 to 80° C. for a residence time of 0.8 minutes in a swelling zone of the extruder so that the cellulose powder was sufficiently swollen with the NMMO solution. Then, the powder was thoroughly dissolved in a dissolution zone of the extruder while maintaining temperatures of each block at 90 to 95° C. and operating the screw at 200 rpm and the resulting solution was spun through a nozzle.

The spinning solution had a concentration of 11.1 wt % and was in a homogeneous state without undissolved cellulose particles.

The cellulose solution was subjected to a dry-wet spinning with a final filament finness of 1,650 denier.

The filament yarn prepared above were twisted with a same twist number for cable twist/ply twist using a direct twisting machine, as shown in Table 1, and dipped in a common RFL solution, followed by a thermal treatment to form a dip cord, which was evaluated for properties.

TABLE 1

| Sample | Example 1 | | | | | Compartive Example 1 |
| --- | --- | --- | --- | --- | --- | --- |
|  | A-1 | A-2 | A-3 | A-4 | A-5 | A-6 |
| Celluose concentration in NMMO solution(%) | 0.05 | 0.5 | 1.0 | 1.5 | 2.0 | — |
| Cellulose concentation in discharged solution(%) | 11.1 | 11.1 | 11.1 | 11.1 | 11.1 | 11.1 |
| Temperature of swelling zone of extruder(° C.) | 76 | 72 | 66 | 63 | 60 | 82 |
| Temperature of final block of extruder(° C.) | 95 | 94 | 93 | 93 | 90 | 100 |
| Evaluation undissolved particle in solution[1] | 1 | 1 | 0 | 0 | 0 | 15 |
| DP of filament after spinning | 1030 | 1000 | 990 | 970 | 960 | 920 |
| Tenacity of filament(g/d) | 7.2 | 7.3 | 7.4 | 7.5 | 7.5 | 6.7 |
| Dip cord | 1650 denier/2 ply | | | | | |
| Twist number(TPM) cable twist/ply twist | 470/470 | | | | | |
| Construction(Ply) | 2 | | | | | |
| Twist constant(R) | 0.87 | | | | | |
| Strength(kgf) | 17.7 | 17.9 | 18.3 | 18.8 | 18.8 | 15.5 |
| Elongation at specific load(%) | 2.2 | 2.2 | 2.2 | 2.1 | 2.1 | 2.5 |
| Shrinkage(%) | 0.4 | 0.3 | 0.3 | 0.3 | 0.3 | 0.5 |
| E-S | 2.6 | 2.5 | 2.5 | 2.4 | 2.4 | 3.0 |
| Adhesion(kgf) | 16.0 | 16.2 | 16.0 | 16.3 | 16.5 | 14.0 |
| Fatigue resistance(%) | 84 | 84 | 86 | 87 | 89 | 80 |

[1] the number of undissolved particles(in 5 × 5 mm$^2$)

Comparative Example 1

Cellulose having a weight average degree of polymerization of 1200 was pulverized in a pulverizer to a diameter of 5000 μm or less. The resulting powder was directly injected to a twin screw extruder with a liquid NMMO (1 hydrate) at 89° C., dissolved while maintaining each block temperature at 100° C. and spun.

The solution had a concentration of 11.1 wt % and was observed to contain undissolved particles with a diameter of 50 to 100 μm under a polarized optical microscope. The cellulose polymerization was 920.

EXAMPLE 2

The filament yarn prepared by adding 1 wt % of cellulose powder to NMMO in Example 1 was twisted with a same twist number for cable twist/ply twist using a direct twisting machine, as shown in Table 2, and dipped in a common RFL solution, followed by a thermal treatment to form a dip cord, which was evaluated for properties.

TABLE 2

|  | Example 2 | | | | | |
| --- | --- | --- | --- | --- | --- | --- |
| Sample | B-1 | B-2 | B-3 | B-4 | B-5 | B-6 |
| Dip cord | | | | | | |
| Twist number(TPM) cable twist/ply twist | 360/360 | 400/400 | 420/420 | 450/450 | 470/470 | 500/500 |
| Construction(Ply) | 2 | 2 | 2 | 2 | 2 | 2 |
| Twist constant(R) | 0.63 | 0.71 | 0.75 | 0.86 | 0.87 | 0.92 |
| strength(kgf) | 22.5 | 21.8 | 19.5 | 18.5 | 18.3 | 15.8 |
| Elongation at specific load(%) | 1.7 | 1.8 | 2.0 | 2.2 | 2.2 | 2.3 |
| Shrinkage(%) | 0.1 | 0.2 | 0.3 | 0.3 | 0.3 | 0.4 |
| E-S | 1.8 | 2.0 | 2.3 | 2.5 | 2.5 | 2.7 |
| Adhesion(kgf) | 13.0 | 14.8 | 15.0 | 15.3 | 16.0 | 16.0 |
| Fatigue resistance(%) | 81 | 82 | 83 | 83 | 86 | 88 |

A greige cord was prepared in a double twisted yarn with a same twist number for cable twist/ply twist. As the twist number of the dip cord increased, the strength was decreased and elongation at specific load and fatigue resistance were increased.

Comparative Example 2

Using the filament yarn prepared by adding 1 wt % of cellulose powder to NMMO in Example 1, greige cords were prepared with a same twist number for cable twist/ply twist of 250/250, 300/300 and 520/520, as shown in Table 3, and dipped in a common RFL solution, followed by a thermal treatment to form dip cords, which were evaluated for their properties.

TABLE 3

|  | Comparative Example 2 | | |
| --- | --- | --- | --- |
| Sample | C-1 | C-2 | C-3 |
| Construction(Ply) | 2 | 2 | 2 |
| Twist number(TPM) cable twist/ply twist | 250/250 | 300/300 | 520/520 |
| Twist constant(R) | 0.42 | 0.51 | 0.96 |
| strength(kgf) | 23.5 | 22.9 | 13.7 |
| Elongation at specific load(%) | 1.0 | 1.1 | 2.9 |
| Shrinkage(%) | 0.2 | 0.2 | 0.3 |
| E-S | 1.2 | 1.3 | 3.2 |
| Fatigue resistance(%) | 50 | 53 | 94 |

When the twist number was 250/250 and 300/300TPM, the strength was as high as 23.5 kg and 22.9 kg while the fatigue resistance was significantly low, which was not suitable for a tire cord. When the twist number was 520/520, the fatigue resistance was 94% while the strength was not enough for a tire cord.

EXAMPLE 3

The filament yarn prepared by adding 1 wt % of cellulose powder to NMMO in Example 1 was twisted into a double twisted yarn or a triple twisted yarn with different twist numbers for cable twist and ply twist using a direct twisting machine and dipped in a common RFL solution, followed by a thermal treatment to form a dip cord, which was evaluated for properties.

TABLE 4

|  | Example 3 | | | | | | | |
| --- | --- | --- | --- | --- | --- | --- | --- | --- |
| Sample | D-1 | D-2 | D-3 | D-4 | D-5 | D-6 | D-7 | D-8 |
| Dip cord | | | | | | | | |
| Twist number(TPM) cable twist/ply twist | 420/320 | 420/470 | 420/520 | 470/420 | 320/520 | 420/320 | 420/470 | 420/520 |
| Construction(Ply) | 2 | 2 | 2 | 2 | 2 | 3 | 3 | 3 |
| Twist constant(R) | 0.63 | 0.71 | 0.75 | 0.86 | 0.87 | 0.60 | 0.67 | 0.71 |
| Strength(kgf) | 22.5 | 21.1 | 19.5 | 18.1 | 20.8 | 30.1 | 28.4 | 27.7 |
| Elongation at specific load(%) | 1.7 | 1.8 | 2.0 | 2.2 | 2.2 | 1.8 | 2.1 | 2.3 |
| Shrinkage(%) | 0.2 | 0.2 | 0.3 | 0.3 | 0.4 | 0.1 | 0.3 | 0.3 |
| E-S | 1.9 | 2.0 | 2.3 | 2.5 | 2.6 | 1.9 | 2.4 | 2.6 |
| Adhesion(kgf) | 14.0 | 14.8 | 14.9 | 14.3 | 13.5 | 13.3 | 14.5 | 15.1 |
| Fatigue resistance(%) | 85 | 88 | 92 | 87 | 91 | 87 | 88 | 90 |

When the filament was twisted into a double twisted yarn with different twist numbers for cable twist and ply twist, if the twist number for cable twist was constant and the twist number for ply twist increased, the strength decreased and the fatigue resistance increased. However, when the twist number for ply twist was constant and the cable twist increased (420/520, 320/520), the fatigue resistance little changed. In case of the triple twisted yarn, when the twist number of the ply twist increased, the strength decreased while the elongation at specific load and the fatigue resistance increased.

EXAMPLE 4

Filaments with total deniers of 1000 and 2200 were spun from the cellulose solution prepared by adding 1 wt % of cellulose powder to NMMO in Example 1 and twisted into a double twisted yarn using a direct twisting machine. The produced greige cord was dipped in a common RFL solution, followed by a thermal treatment, to form a dip cord, which was evaluated for properties.

TABLE 5

| | Example 4 | | | | | |
|---|---|---|---|---|---|---|
| Sample | E-1 | E-2 | E-3 | E-4 | E-5 | E-6 |
| Filament denier | 1000 | 1000 | 1000 | 2200 | 2200 | 2200 |
| Construction(Ply) | 2 | 2 | 2 | 2 | 2 | 2 |
| Twist number(TPM) cable twist/ply twist | 350/350 | 400/400 | 470/470 | 300/300 | 350/350 | 420/420 |
| Twist constant(R) | 0.34 | 0.39 | 0.45 | 0.50 | 0.57 | 0.67 |
| strength(kgf) | 18.5 | 15.7 | 13.7 | 27.1 | 26.4 | 23.8 |
| Elongation at specific load(%) | 2.7 | 3.2 | 3.4 | 2.1 | 2.8 | 2.9 |
| Shrinkage(%) | 0.2 | 0.2 | 0.3 | 0.3 | 0.3 | 0.4 |
| E-S | 2.9 | 3.4 | 3.7 | 2.4 | 3.1 | 3.3 |
| Fatigue resistance(%) | 78 | 83 | 85 | 79 | 85 | 88 |

When the 1000 denier and 2200 denier lyocell filaments were twisted into a double twisted yarn, if the twist number increased, the strength largely decreased but the elongation at specific load and the fatigue resistance increased. On the other hand, the dry heat shrinkage did not show a significant change.

EXAMPLE 5

The NMMO solution with 1 wt % of cellulose powder added in Example 1 and a powder mixture of cellulose/polymer substances (additives) were directly injected to a twin screw extruder and subjected to a dry-wet spinning with a final filament fineness of 1,650 denier. Here, the mixture comprised polyvinyl alcohol, carboxylmethyl cellulose, polyethylene glycol, titanium dioxide, silicon dioxide and the like and was used in an amount of 1 wt % relative to the cellulose powder. The produced yarn was twisted into a double twisted yarn using a direct twisting machine. The produced greige cord was dipped in a common RFL solution, followed by a thermal treatment, to form a dip cord, which was evaluated for properties.

TABLE 6

| | Example 5 | | | | |
|---|---|---|---|---|---|
| Sample | A-1 | A-2 | A-3 | A-4 | A-5 |
| Cellulose concentration in NMMO solution(%) | | | 1.0 | | |
| Cellulose concentration in discharged solution(%) | | | 11.1 | | |
| Mixture type of cellulose/additive[1] | Cell/PVA | Cell/CMC | Cell/PEG | Cell/TiO$_2$ | Cell/SiO$_2$ |
| Tenacity of filament(g/d) | 7.3 | 7.1 | 7.2 | 7.0 | 7.0 |
| Dip cord | | | 1650 denier/2 ply | | |
| Twist number(TPM) cable twist/ply twist | | | 470/470 | | |
| Construction(Ply) | | | 2 | | |
| Twist constant(R) | | | 0.87 | | |
| strength(kgf) | 18.7 | 17.9 | 18.0 | 18.9 | 18.5 |
| Elongation at specific load(%) | 2.5 | 2.7 | 2.6 | 2.1 | 2.1 |
| Shrinkage(%) | 0.7 | 0.8 | 0.7 | 0.4 | 0.2 |
| E-S | 3.2 | 3.5 | 3.3 | 2.5 | 2.3 |

TABLE 6-continued

| | Example 5 | | | | |
|---|---|---|---|---|---|
| Sample | A-1 | A-2 | A-3 | A-4 | A-5 |
| Adhesion(kgf) | 17.0 | 16.2 | 16.0 | 15.3 | 16.5 |
| Fatigue resistance(%) | 88 | 87 | 88 | 84 | 82 |

[1]Cell; Cellulose, PVA; Polyvinyl alcohol, CMC;

Carboxylmethyl Cellulose, PEG; Polyethylene Glycol

When polyvinyl alcohol was added to the cellulose powder, the strength and adhesion was excellent, while the fatigue resistance improved when Carboxylmethyl cellulose and polyethylene glycol were added. The dip cords with titanium dioxide and silicon dioxide added generally showed high strength but low E-S and fatigue resistance.

EXAMPLE 6

A radial tire prepared using the lyocell dip cord prepared according to Example 1 (A-5) comprised a carcass layer having a radially outer ply turn-up, which included one layer of the dip cord. Here, the carcass cord had a mode described in Table 7 below and disposed at an angle of 90° against the circumferentially central surface of a tire. The ply turn-up 14 had a height of 40 to 80% relative to the maximum cross-sectional height of the tire. The bead part 15 comprised a bead core 16 formed of a high strength steel wire with a diameter of 0.95 to 1.00 mm in a 4×4 structure and a bead filler 17 having a shore A hardness of 40 or more. A belt 18 was reinforced by a belt-reinforcing layer comprising one layer of a cap ply 19 and one layer of an edge ply 24 in the upper part and the cap ply 19 comprised cap ply cords arranged parallel to the circumferential direction of the tire.

EXAMPLE 7

Except that the lyocell dip cord prepared according to Example 1 (A-3) was used as the cap ply cord in the cap ply 19, a tire was prepared by the same method of Example 6.

Comparative Example 3

Except that the lyocell dip cord prepared with the twist number of the cable twist/ply twist of 300 TPM (Comparative Example 2 (C-2)) was used, a tire was prepared by the same method of Example 6.

Comparative Example 4

Except that the lyocell dip cord prepared with the twist number of the cable twist/ply twists of 520 TPM (Comparative Example 2 (C-3)) was used, a tire was prepared by the same method of Example 6.

The 215/60 R15 V tires prepared in Examples 6 and 7 and Comparative Examples 3 and 4 were mounted on passenger cars of a 2000cc class. While the car was driven at a speed of 60 km/h, the noise generated inside the car was measured in dB within the audio frequency range. The handling stability and ride comfort was evaluated by giving a score by unit of 5 point with a maximum score of one hundred point while a skillful driver drove a test course and the result are shown in Table 7. The endurance was measured according to P-metric tire endurance test of FMVSS 109. After running at a temperature of 38 (±3° C.) under load conditions of 85, 90 and 100% of the inscribed load on the tire at a driving speed of 80 km/h for the total of 34 hours, if none of bead separation, cord breakage and belt separation was observed in any parts of the thread, side wall, carcass cord, inner liner, bead and the like, the tire was judged as OK.

TABLE 7

|         |                              | Example 6 | Example 7 | Comparative Example 3 | Comparative Example 4 |
|---------|------------------------------|-----------|-----------|-----------------------|-----------------------|
| Carcass | Material                     | lyocell   | lyocell   | lyocell               | lyocell               |
|         | Specification (d/twist yarn) | 1650d/2   | 1650d/2   | 1650d/2               | 1650d/2               |
|         | EPI(ends/in)                 | 24        | 24        | 25                    | 25                    |
|         | Strength(kgf)                | 26        | 26        | 24                    | 23                    |
|         | Elastic coefficient(g/d)     | 90        | 90        | 89                    | 88                    |
| Cap ply | Material                     | nylon     | lyocell   | nylon                 | nylon                 |
|         | Specification (d/twist yarn) | 1260d/2   | 1650d/2   | 1260d/2               | 1260d/2               |
|         | Strength(kgf)                | 24        | 26        | 24                    | 24                    |
|         | Elastic coefficient(g/d)     | 30        | 90        | 30                    | 30                    |
| Tire    | Aspect ratio                 | 0.60      | 0.60      | 0.60                  | 0.60                  |
|         | Number of Car cass layers    | 1         | 1         | 1                     | 1                     |
|         | Number of cap ply layers     | 1         | 1         | 1                     | 1                     |
|         | Weight of tire(kg)           | 9.83      | 9.96      | 9.94                  | 10.01                 |
|         | Ride comfort                 | 100       | 100       | 91                    | 94                    |
|         | Handling stability           | 100       | 100       | 94                    | 94                    |
|         | Endurance                    | OK        | OK        | OK                    | OK                    |
|         | Uniformity                   | 100       | 100       | 94                    | 96                    |
|         | Noise(dB)                    | 61.4      | 59.8      | 64.5                  | 63.2                  |

From the result of Table 7, the tire (Example 6) using the lyocell fiber according to the present invention showed a weight smaller than the tires of Comparative Examples 3 and 4, which indicated that the rotation resistance could be reduced. Also, the tire (Example 7) applying the lyocell fiber in both the carcass layer and cap ply showed a significantly reduced noise level.

Further, the tire applying the lyocell cord prepared according to the present invention in the carcass or cap ply showed excellence in the ride comfort, handling stability and uniformity.

The present invention comprises the steps of previously dissolving a small amount of 0.1 to 3 wt % of cellulose powder in a concentrated liquid N-methylmorpholine N-oxide (NMMO) to prepare a NMMO solution. By the effect of the addition of a small amount of pulp to concentrated liquid NMMO to lower the solidification temperature of NMMO, it is possible to feed the NMMO solution to an extruder at a relatively low temperature. As a result, the process temperature range can be expanded and the cellulose powder can be swollen with the NMMO solution at a low temperature. Also, it is possible to prevent a thin film from being formed on the surface of the cellulose powder by an instantaneous dissolution in NMMO at a high temperature and thereby, to produce a homogeneous cellulose solution at a low temperature.

Further, it is possible to inhibit degradation of cellulose occurring during the swelling and dissolution process at a high temperature in an extruder and thereby, to provide cellulose fiber with excellent flexibility and tenacity.

When a tire is manufactured using the lyocell dip cord according to the present invention, the PCI (post curing inflation) process after valcanizing can be omitted. However, the tire shows a RFV (Radial Force Variation) and LFV (Lateral Force Varition) improved by 55 to 100%, as compared to conventional polyester cord tires employing the PCI process after valcanizing, which indicates that the uniformity is improved. Further, according to the present invention, it is possible to prevent an unnecessary waste of time upon tire production and to cut down energy.

According to the present invention, it is possible to provide a tire for passenger cars with improved handling stability, dimensional stability and uniformity by using a tire cord comprising a lyocell multifilament having excellent properties as a tire (for example, low elongation and shrinkage, and improved tenacity and modulus). Also, it is proved that the tire prepared according to the present invention has fatigue properties improved as compared to the conventional tires using a rayon tire cord. Particularly, the tire according to the present invention has excellent dimensional stability with an outer radius growth reduced by 10% or more as compared to the conventional tire using a rayon tire cord.

What is claimed is:

1. A lyocell dip cord for tire cord produced by a method comprising the steps of: (A) dissolving 0.01 to 3 wt % of cellulose powder in portions in concentrated liquid N-methylmorpholine N-oxide (NMMO) to prepare cellulose-containing NMMO solution;
   (B) feeding the NMMO solution and cellulose powder into an extruder having a screw to be subjected to dispersing, mixing, shearing, kneading, melting and measuring ability in the extruder to prepare a swollen and homogenized cellulose solution;
   (C) spinning the cellulose solution through a spinning nozzle, passing the spinning solution through an air gap to a coagulation bath and coagulating the spinning solution to obtain a multifilament;
   (D) subject the multifilament to water-wash, drying and oil-treatment, followed by winding; and
   (E) twisting the wound yarn with a twisting machine to prepare a greige cord, weaving the greige cord and dipping the woven cord in a dipping solution,
   in which the cord has (1) a tensile strength of 14.0 to 35.0 kgf, (2) a fineness of 2,000 to 7,000 denier, (3) a fatigue resistance of 80% or more, (4) an adhesion to rubber of 10.0 to 17.0 kgf, (5) a twist constant of 0.30 to 0.95, and (6) the sum of elongation at specific load (at a specific load of 4.5 kg) and shrinkage (E-S) of 1.0 to 4.0.

2. The cord according to claim 1, in which said NMMO in the step (A) is provided at a temperature of 50 to 100° C.

3. The cord according to claim 1, in which said twisting in the step (E) is carried out at 300/300 TPM to 500/500 TPM for cable twist/ply twist.

4. The cord according to claim 1, in which said twisting in the step (E) is carried out at 350 TPM to 550 TPM for cable twist and at 300 TPM to 550 TPM for ply twist and said twistings for cable twist and ply twist are different from each other.

5. Pneumatic radial tire having an aspect ratio of less than 0.65, which comprises a pair of parallel bead cores, at least one radial carcass ply wound around the bead cores, a belt layer formed on the outer circumferential side of the carcass ply, a circumferential belt-reinforcing layer formed on the outer circumferential side of the belt layer, in which the carcass ply or belt-reinforcing layer comprising a lyocell dip cord defined in claim 1.

6. The tire according to claim 5, in which said carcass ply is used in a single layer structure.

7. The tire according to claim 5, in which said carcass ply is used in a two-layered structure.

8. The tire according to claim 5, in which said belt-reinforcing layer is reinforced by a cap ply.

9. The tire according to claim 5, in which said carcass ply or belt-reinforcing layer has a dip cord reinforcement density of 15 to 35 EPI.

* * * * *